United States Patent [19]

Henry

[11] 4,392,231
[45] Jul. 5, 1983

[54] SPREAD SPECTRUM FH-MFSK DECODER

[75] Inventor: Paul S. Henry, Holmdel, N.J.

[73] Assignee: Bell Telephone Laboratories, Incorporated, Murray Hill, N.J.

[21] Appl. No.: 279,472

[22] Filed: Jul. 1, 1981

Related U.S. Application Data

[63] Continuation-in-part of Ser. No. 164,160, Jun. 30, 1980, abandoned.

[51] Int. Cl.³ .............................................. H03K 13/01
[52] U.S. Cl. .......................................... 375/80; 375/1; 329/104
[58] Field of Search ........................... 375/1, 2, 79, 80; 364/485, 572; 329/104; 370/93

[56] References Cited

U.S. PATENT DOCUMENTS

| | | | |
|---|---|---|---|
| 4,041,391 | 8/1977 | Deerkowski | 375/1 |
| 4,066,964 | 1/1978 | Constanza et al. | 375/1 |
| 4,123,719 | 10/1978 | Hopwood et al. | 329/104 |
| 4,193,030 | 3/1980 | Rabow et al. | 375/2 |
| 4,271,524 | 6/1981 | Goodman et al. | 375/1 |
| 4,320,514 | 3/1982 | Haskell | 375/1 |

OTHER PUBLICATIONS

Cooper et al., "A Spread Spectrum Technique for High Capacity Mobile Communication", from Conf. Rec. 27th, IEEE Vehicular Tech. Conf., Orlando, Fla., pp. 98–103.

D. P. Grybos et al., "A Receiver Feasibility Study for the Spread Spectrum High Capacity Mobile Radio System", by Con. Rec. 28, IEEE Vehicular Tech. Con., Colo., pp. 98–104.

Viterbi, "A Processing Satellite Transponder for Multiple Access by Low Rate Mobile Users", 4th Int. Con. on Digital Satellite Com., Montreal, Canada, pp. 166–174.

Goodman et al., "Frequency Hopped Multilevel FSK for Mobile Radio, IEEE 1980, International Zurich Seminar on Digital Communication, pp. A5.1–A5.6.

R. C. Williamson et al., "A Satellite Borne Saw Chirp-Transform System for Uplink Demodulation of FSK Communication Signals", Sep. 26–28, 1979, 1979 Ultrasonics Symposium Proceedings, New Orleans, La., Paper E-1.

*Primary Examiner*—Benedict V. Safourek
*Assistant Examiner*—Stephen Chin
*Attorney, Agent, or Firm*—Erwin W. Pfeifle

[57] ABSTRACT

The present invention relates to a decoder for use in a spread spectrum radio receiver which is capable of directly demodulating an L-length frequency-hopped, Q-level frequency shift keyed radio-frequency received signal into a baseband signal wherein a desired user's message signal is decoded into a sequence of tone bursts at a fixed frequency over each L-length sequence. Spectral analysis is performed on the resultant baseband signal either during each chip interval or once at the end of each L-length sequence to permit subsequent detection of a desired user's correct received message signal.

6 Claims, 4 Drawing Figures

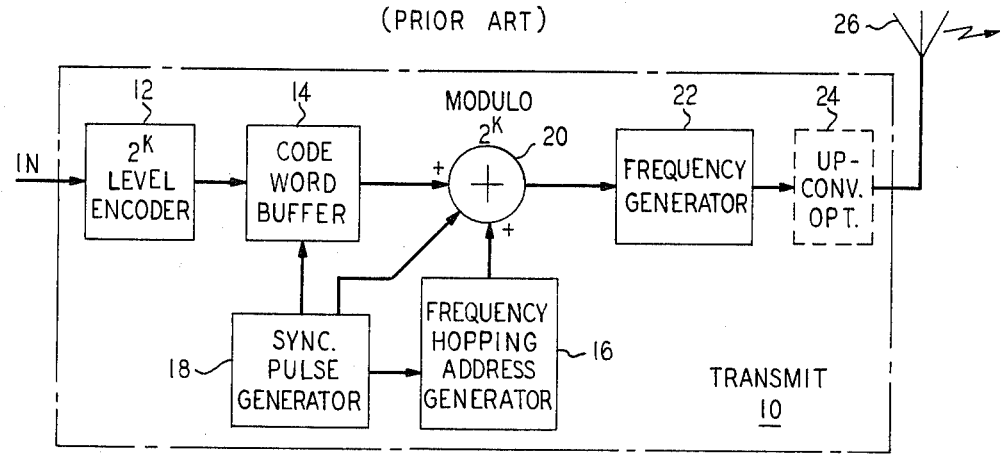
FIG. 1
(PRIOR ART)
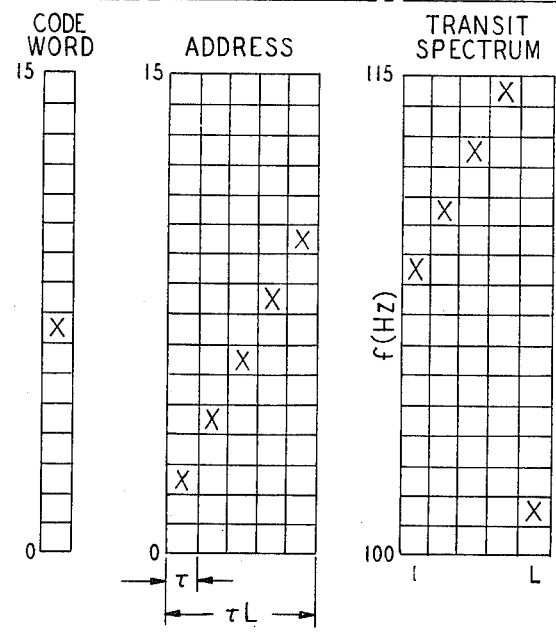
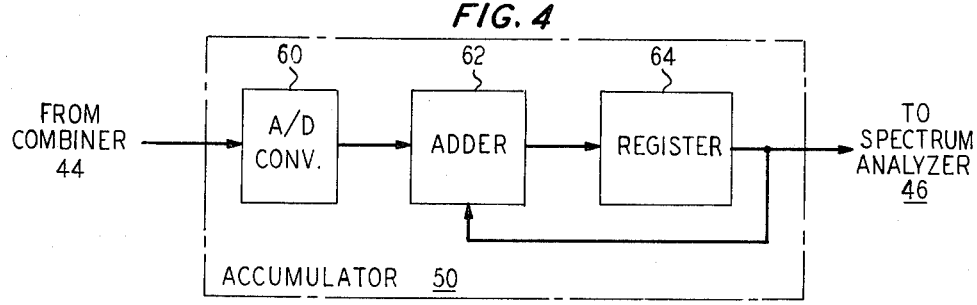
FIG. 4

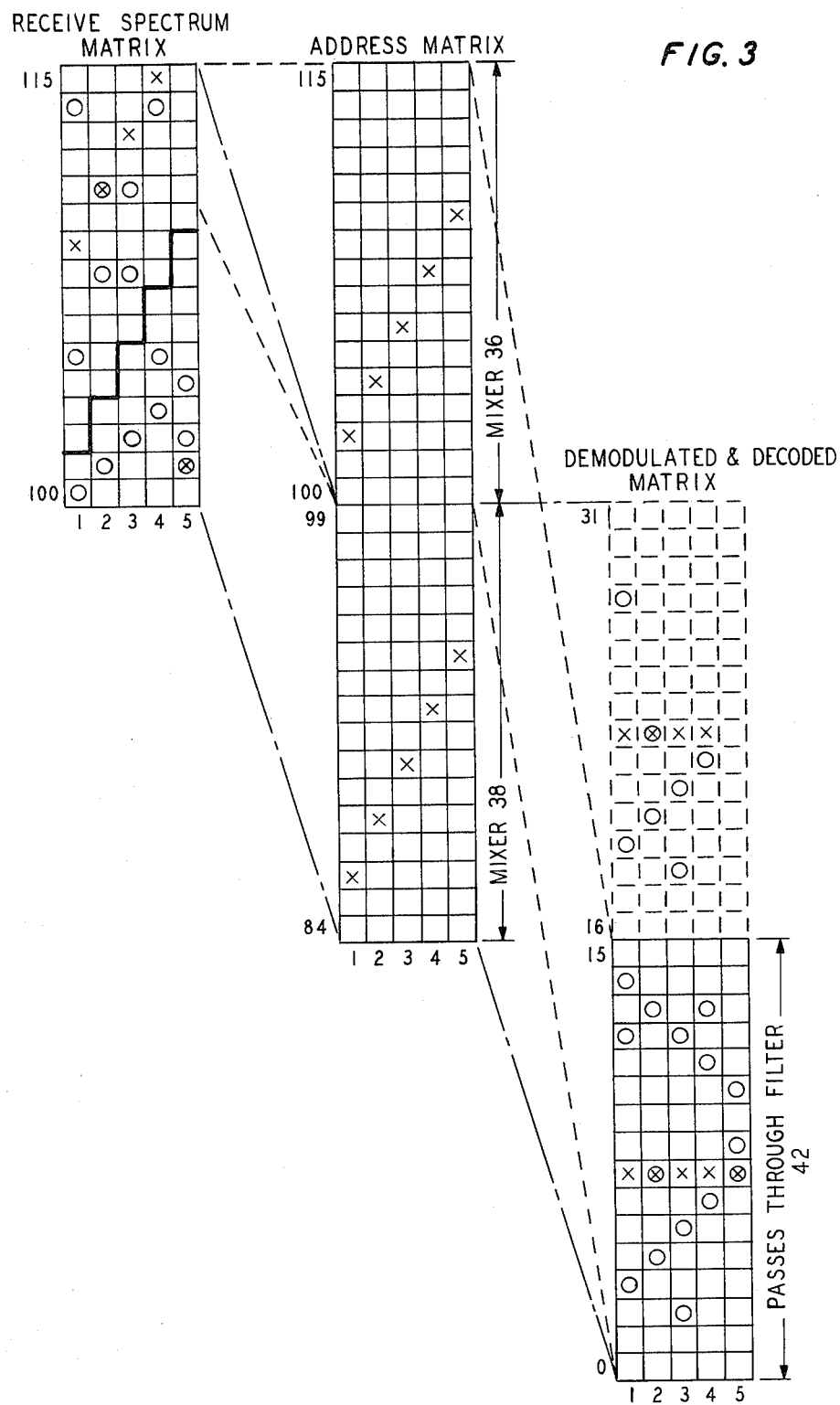

SPREAD SPECTRUM FH-MFSK DECODER

CROSS-REFERENCE TO RELATED APPLICATION

The present application is a continuation-in-part application of U.S. patent application, Ser. No. 164,160 filed on June 30, 1980, now abandoned.

BACKGROUND OF THE INVENTION

1. Field of the Invention

The present invention relates to a spread spectrum frequency-hopping, multilevel frequency shift keying (FH-MFSK) decoder and, more particularly, to a spread spectrum FH-MFSK decoder for use in a radio receiver where the decoder is capable of directly demodulating a Q level, L-length FH-MFSK radio-frequency input signal into a baseband signal, wherein a desired user's message signal is a sequence of tone bursts at a fixed frequency over an L-length sequence, prior to steps of spectrum analysis and detection of the correct level within the baseband signal corresponding to the desired user's message signal.

2. Description of the Prior Art

Spread spectrum radio communication systems using various modulation techniques have evolved to provide protection of transmitted radio signals from detection, demodulation and/or interference by outside sources. In multiple access spread spectrum communication, each user has access to the whole system bandwidth. One way of distinguishing the signals from different users is to give each user an address consisting of a fixed pattern in time and frequency. The information to be transmitted is modulated or coded onto the address. The receiver detects the appropriate address and decodes the message. This technique is often referred to as random-access-discrete-address (RADA) or code-division multiple access (CDMA).

The two major impairments of mobile radio communication systems are interference from other users and multipath fading. The conventional Frequency Division Multiple Access (FDMA) technique uses guard bands between frequency channels to minimize interference and increased signal power to combat fading. Recently, various frequency-hopping (FH) techniques have been provided for use in mobile and satellite radio systems.

One such technique is disclosed in the article "A Spread Spectrum Technique for High Capacity Mobile Communications" by G. R. Cooper et al in the Conference Record of the *Twenty-Seventh Annual IEEE Vehicular Technology Conference* at Orlando, Fla. on Mar. 16-18, 1977 at pages 98-103 which relates to a cellular spread spectrum frequency-hopped, differential phase shift keying (FH-DPSK) mobile communication system. In a typical receiver an array of delay lines and bandpass filters selects the desired address waveform out of the incoming signal. The phases of the various elements of the desired signal are detected relative to the previous word and are then passed through a linear combiner and maximum-likelihood decision circuit for proper processing.

Another technique for use with a satellite communication system is disclosed in the article "A Processing Satellite Transponder for Multiple Access by Low-Rate Mobile Users" by A. J. Viterbi in the Conference Record of the *Fourth International Conference on Digital Satellite Communications* at Montreal, Canada on Oct. 23-25, 1978 at pages 166-174 which relates to a frequency-hopping, multilevel frequency shift-keyed (FH-MFSK) arrangement. In the disclosed receiving section, a set of received $2^K$ level, L-length signals are spectrally decoded and processed to select a produced L-length transmission as the decoded signal. If two or more L-length signals are produced, resolution would be to arbitrarily choose one as the correct message.

Alternatively, a mobile radio communication system is disclosed in the article "Frequency Hopped Multilevel FSK for Mobile Radio" by D. J. Goodman et al in the Conference Record of the 1980 *International Zurich Seminar on Digital Communications* Mar. 4-6, 1980, Zurich, Switzerland at pages A5.1-Ab.6 at FIG. 2 thereof, a receiver is shown wherein a signal comprising multiple user's transmitted signals are spectrum analyzed to determine which frequencies were received during each period of a sequence of frequency-hopped signals and a particular user's FH address sequence is subtracted modulo-$2^K$ from such spectral determinations for deriving the decoded signals. A majority logic decision rule is applied to arrive at a correct message signal when noise or multipath propagation influence detection matrix entries.

The prior art frequency-hopping receivers, however, generally spectrum analyze the received signals on a chip-by-chip basis over the L-length sequence and similarly process the resultant analyzed signals to determine the particular user's correct message signal. The problem remaining in the prior art is to provide a decoding arrangement which concurrently demodulates and decodes an rf input signal and also enables the avoidance of a chip-by-chip spectral analysis of a FH-MFSK received signal and thereby permits a simpler receiver arrangement.

SUMMARY OF THE INVENTION

The foregoing problem has been solved in accordance with the present invention which relates to a spread spectrum frequency-hopping, multilevel frequency shift keying (FH-MFSK) decoder and, more particularly, to a spread spectrum FH-MFSK decoder for use in a radio receiver where the decoder is capable of directly demodulating a Q level, L-length FH-MFSK radio frequency (rf) input signal into a baseband signal, wherein the desired user's message signal is decoded into a sequence of tone bursts at a fixed frequency over an L-length sequence prior to steps of spectrum analysis and detection of the correct level within the baseband signal corresponding to the desired user's message signal.

It is an aspect of the present invention to provide a spread spectrum FH-MFSK decoder which is capable of directly demodulating a Q level, L-length FH-MFSK radio frequency input signal into a baseband signal wherein the desired user's message signal is decoded into a sequence of tone bursts at a fixed frequency and each of the Q level frequencies is accumulated over the L-length sequence and spectrum analyzed at the end of each sequence to provide simplified spectral analysis and receiver construction.

Other and further aspects of the present invention will become apparent during the course of the following description and by reference to the accompanying drawings.

BRIEF DESCRIPTION OF THE DRAWING

Referring now to the drawings, in which like numerals represent like parts in the several views:

FIG. 1 is a block diagram of a prior art FH-MFSK transmitter;

FIG. 3 illustrates an exemplary Receive Spectrum Matrix, an exemplary Address Matrix and the Demodulated and Decoded Matrix resulting therefrom when applied to the Decoder in FIG. 2; and FIG. 4 is a block diagram of an exemplary accumulator for use in the Decoder of FIG. 2 in accordance with the present invention.

DETAILED DESCRIPTION

Figure 2:
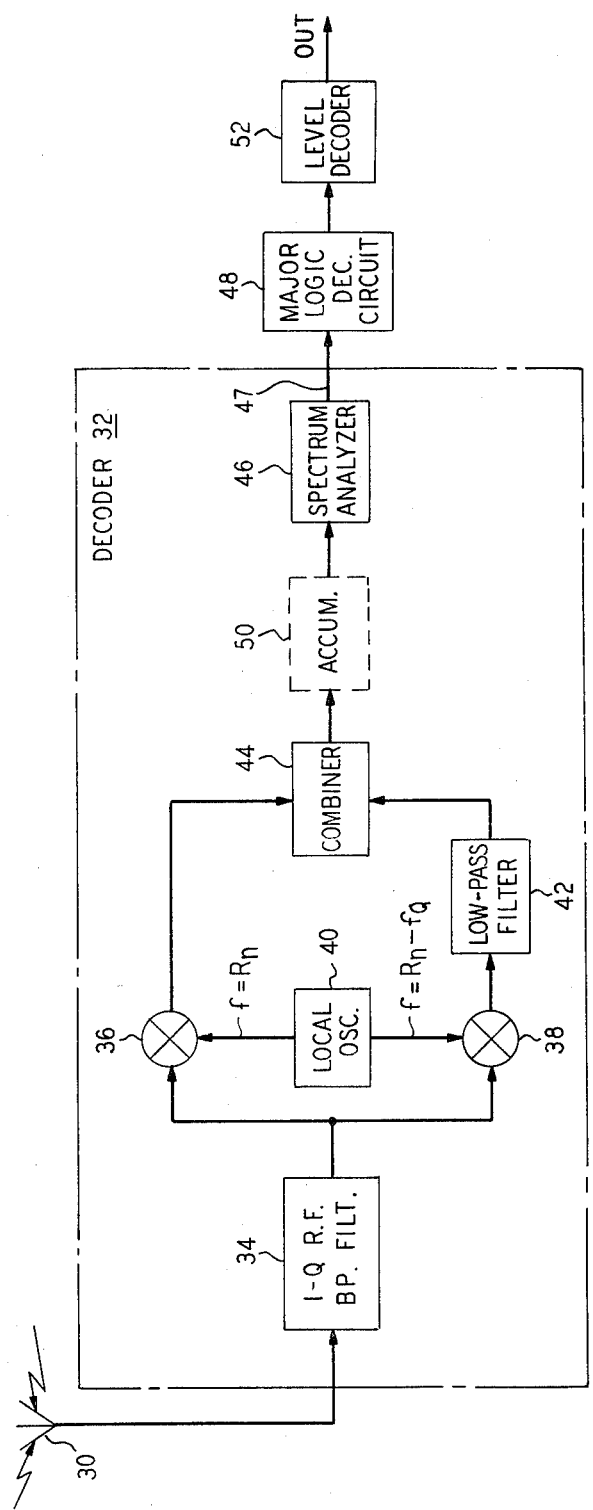
FIG. 2 is a block diagram of a FH-MFSK receiver capable of receiving multiple FH-MFSK signals and demodulating and decoding the received signals in accordance with the present invention to enable the detection of a particular user's signal.

The present invention is described hereinafter primarily with the use of $2^K$ frequencies or elements where $K=4$. However, it will be understood that such description is exemplary only and is for the purposes of exposition and not for purposes of limitation. It will be readily appreciated that the inventive concept described is equally applicable for use in systems with Q frequencies, where, for example, $Q=p^n$ where p and n are integers.

A block diagram of a typical spread spectrum frequency-hopping, multilevel frequency shift keying (FH-MFSK) transmitter for use, for example, in a mobile radio communication system in accordance with the present invention is shown in FIG. 1. Such transmitter was shown and described in the hereinbefore mentioned article by D. J. Goodman et al. The transmitter 10 comprises a $2^K$ level encoder 12 which functions, for example, to periodically sample an analog input signal from a particular system user and convert the amplitude level of each sample into an equivalent K-bit code word. If, on the other hand, the input signal from the particular system user is already in binary form, encoder 12 can operate, for example, to use each group of K sequential bits as the individual K-bit code word. In either case, the resultant K-bit code word is stored temporarily in a code word buffer 14 and made available at its output. An exemplary code word is shown in FIG. 1 below code word buffer 14 and designated "Code Word" where the code word comprises an indication in the $8^{th}$ level (level 7) of a possible 16 levels (0-15), where $K=4$.

A frequency-hopping address generator 16 functions to generate a unique frequency-hopping address sequence which is different for each system user within the same zone or cell. The address is a sequence of L chips with each chip having a duration of $\tau$ seconds and comprising one level, or one K-bit word, of a possible $2^K$ levels. Chip words or levels can be different for each chip of the address. For example, as shown in the matrix designated "Address" below generator 16 in FIG. 1, an address sequence for a particular system user may comprise five chips, where $L=5$, where chips 1-5 are designated levels 2, 4, 6, 8 and 10, respectively, having a +2 slope within the $2^K$ possible code levels for each chip, where $K=4$.

A synchronizing pulse generator 18 functions to generate pulses from an internal clock for causing the code word indication to be stored in buffer 14 and, following this, each chip level of the address to be sequentially transmitted from generator 16 to a modulo-$2^K$ adder 20. Adder 20 functions to modulo-$2^K$ add the K-bit code word and, sequentially, the address chip words to generate a new L-length sequence of code words or levels as shown in, for example, the matrix designated "Transmit Spectrum" in FIG. 1. This resultant new code word sequence is used by a frequency generator 22 to generate a particular one of $2^K$ frequencies, within the system's overall bandwidth which will hereinafter be considered to be within the bandwidth of frequencies 100-115, for each chip of $\tau$ second duration of the new code word sequence as designataed by the corresponding level of each chip of the Transmit Spectrum. For example, for the "Transmit Spectrum" matrix of FIG. 1, frequency generator 22 will transmit frequencies corresponding to the $109^{th}$, $111^{th}$, $113^{th}$, $115^{th}$ and $101^{st}$ levels of the possible matrix levels 100-115 during the $\tau$ second durations of chips 1-5, respectively, where $K=4$. This sequence of L tones or frequencies can be upconverted by optional upconverter 24 into the proper system transmit frequency spectrum covering frequencies 100-115 if not already done so by generator 22 for transmission by antenna 26.

In summary, at transmitter 10, K source bits are accumulated in a buffer 14 and held for $L\tau$ seconds while they are added modulo-$2^K$ as a K-bit word to each of the elements of the address from generator 16. The sums determine the sequence of transmitted frequencies. In this way, K bits are transmitted during the $L\tau$ seconds. Therefore, the elementary signals are a set of $2^K$ tones, each of duration $\tau$ seconds. Each link or user pair in the system is identified by an address which is a unique sequence of L K-bit words, one K-bit word for each chip. A new code word, conveying K bits, is transmitted every $L\tau$ seconds as a sequence of L tones. Each tone is determined by the sum (modulo-$2^K$) of a K-bit word from the source and one of the K-bit address words.

FIG. 2 illustrates a receiver in accordance with the present invention capable of receiving and decoding a FH-MFSK signal transmitted by one or more transmitters of the type shown in FIG. 1. The FH-MFSK signal is received at an antenna 30 and applied to the input of a decoder 32. In decoder 32 the input signal is applied to the input of a radio-frequency (rf) bandpass filter 34 which is tuned to pass only the Q frequencies transmitted by the transmitter of FIG. 1, which for the present exemplary case is the rf frequencies 100-115, and block all other frequencies outside such passband. The received signal passing through filter 34 is generally a composite of the time-synchronous tone sequences of a plurality of transmitters. For example, the received signal passing through filter 34 can comprise elements forming a "Receive Spectrum" matrix as shown in FIG. 3 which includes the transmitted tones of FIG. 1, designated by the "Xs", and the tones, indicated by circles, received from three other links.

The filtered signal at the output of filter 34 is divided into two separate paths and applied to a first and a second mixer 36 and 38. Mixer 36 is an image-rejection mixer which downconverts signals whose frequencies are equal to or above the local oscillator frequency, and has zero response to those frequencies below the local oscillator frequency. A local oscillator 40 generates a local oscillator rf frequency for transmission to mixer 36 which is the same as the address sequence of L tones within the bandwidth of frequencies 100-115, to be designated hereinafter as $R_n$, of a particular user whose received signal is to be decoded. The output of mixer 36, to be designated $A_n$, is $$A_n = y_n - R_n = \begin{cases} X, & Y_n \geq R_n \\ 0, & Y_n < R_n \end{cases}. \quad (1)$$

where $y_n$ is defined as the modulo-Q ($2^K$ in the present case) addition of the address sequence with the particular user's message signal within the 100–115 level frequency band as shown, for example, in the rf transmitted tone sequence of FIG. 1 and X is defined as the users message signals as received in the rf frequency bandwidth of 100–115.

More particularly, as shown in FIG. 3, mixer 36 mixes the rf frequency of each address chip interval, for the address sequence of a particular user whose signal is to be decoded, with all the received rf frequencies in corresponding chip intervals within the Receive Spectrum which are equal to or higher than the address frequency to generate difference frequencies; with no response occurring with signals below the address frequency. For example, during chip interval 1, the rf address frequency corresponding to frequency 102 is mixed with the Receive Spectrum matrix frequencies equal to or above frequency 102 and corresponding to received frequencies 105, 109 and 114 to produce difference frequencies within the baseband corresponding to frequency levels 3, 7 and 12, respectively, as shown in the Demodulated and Decoded Matrix of FIG. 3. The receive frequency 100 during chip interval 1 is not demodulated since it is below the address frequency 102.

Similarly, during chip interval 2, mixer 36 mixes the rf address frequency corresponding to level 104 with the Receive Spectrum frequencies equal to or above level 104 corresponding to received frequencies for levels 108 and 111 to produce demodulated baseband frequencies corresponding to levels 4 and 7 in the Demodulated and Decoded matrix of FIG. 3. The remaining chip intervals 3–5 are processed in the same manner. In summary, mixer 36 uses the address sequence shown in the rf frequency levels 100–115 of the Address Matrix of FIG. 3 for mixing with frequency components above the heavy line in the Receive Spectrum Matrix of FIG. 3 to generate baseband frequencies in the 0–15 levels of the Demodulated and Decoded matrix of FIG. 3.

Mixer 38 is an ordinary downconverter to which a local oscillator frequency of $R_n - 2^K$ levels is supplied by local oscillator 40. More particularly, the local oscillator frequencies supplied to mixer 38 correspond to the same address sequence provided to mixer 36 but fall within the $2^K$ frequency levels immediately below the $2^K$ frequency band supplied mixer 36, which in the present example would be levels 84–99. The local oscillator tone sequence to mixer 38 is mixed with the rf frequencies received in the corresponding chip intervals within the Receive Spectrum matrix to produce difference signals at the output of mixer 38. For example, during chip interval 1, the rf address frequency corresponding to level 86 is mixed with all the rf Receive Spectrum matrix frequencies received during chip interval 1 corresponding to levels 100, 105, 109 and 114 to produce difference frequencies within the baseband corresponding to frequency levels 14, 19, 23 and 28, respectively.

Similarly, during chip interval 2, mixer 38 mixes the rf address frequency corresponding to level 88 with the Receive Spectrum frequencies corresponding to levels 101, 108 and 111 to generate difference frequencies within the baseband corresponding to frequency levels 13, 20 and 23, respectively, shown in the Demodulated and Decoded matrix of FIG. 3. The remaining chip intervals 3–5 are processed in the same manner. In summary, mixer 38 mixes the received frequency components in levels 100–115 of the Receive Spectrum matrix with corresponding chip interval frequencies of levels 84–99 of the Address Matrix to generate difference frequencies which can fall within baseband levels 0–31 of the Demodulated and Decoded matrix of FIG. 3.

The output from mixer 38 is transmitted through a low-pass filter 42 which is tuned to only pass frequencies within the solid-lined baseband levels 0–15 of the Demodulated and Decoded matrix and block all others within the dash-lined portion of the matrix when mixer 38 produces frequencies outside the 0–15 levels. The outputs from filter 42 and mixer 36 are added in combiner 44 to generate the level 0–15 frequencies shown in FIG. 3 for the exemplary Demodulated and Decoded matrix. In the exemplary Demodulated and Decoded matrix, the original user's message signal is generated in all chip intervals of level 7 where the Xs in chip intervals 1–4 were generated by mixer 36 and the X in chip interval 5 was generated by mixer 38. Mixer 38 also generated the Xs in level 23 of chip intervals 1–4, but such frequency indications are blocked by filter 42 from reaching combiner 44.

In one embodiment of the present invention, the output from combiner 44 can be directly transmitted to a spectrum analyzer 46 where analysis is performed once during each chip interval and the results therefrom are transmitted to a Majority Logic Decision circuit 48 for detecting the maximum-length levels over an L-length sequence in order to determine a particular user's correct message signal. In a preferred embodiment of the present invention, however, the output over the L-length sequence from combiner 44 is accumulated in an accumulator 50 which adds the output voltage waveforms from combiner 44 during each chip interval to the total accumulated waveform from all previous chip intervals of the L-length sequence and the resultant accumulated waveform at the end of the L-length sequence is transmitted to spectrum analyzer 46 for analysis. Spectrum analysis of the waveform from accumulator 50 need only be performed once every $L\tau$ seconds when using accumulator 50 instead of every $\tau$ seconds when the output of combiner 44 is transmitted directly to analyzer 46.

An exemplary accumulator 50 is shown in FIG. 4 where the output every $\tau$ seconds from combiner 44 is transmitted through an analog-to-digital converter 60 and the digital signal from converter 60 is applied to an adder 62. Adder 62 adds the output signal of A/D converter 60 to the accumulated prior output waveforms of A/D converter 60 during the present L-length sequence, which overall magnitude is stored in a register 64 which may comprise a first-in-first-out memory, and transmits the new overall accumulated value to register 64 for storage therein during each chip interval. This sequence is repeated for each of the chip intervals of the L-length sequence and at the end of the L-length sequence the totalized signal is transmitted from register 64 to spectrum analyzer 46 for analysis. From the Demodulated and Decoded matrix of FIG. 3, it can be seen that at the end of the 5 chip sequence, accumulator 50 would send an output signal to spectrum analyzer 48 which had energy at frequencies corresponding to (a) levels 2-6, 8, 10, 11 and 14 having a magnitude equal to 1 unit of energy, (b) levels 12 and 13 having a magnitude 2 units of energy, and (c) level 7 having a magnitude of 7 units of energy. Spectrum analyzer 46 would generate an output signal to Majority Logic Decision circuit 48 over bus 47 which reflects such magnitudes and frequencies and circuit 48 then determines the frequency level having the largest magnitude or length. Majority Logic Decision Circuit 48 uses the Majority Logic Decision Rule promulgated in the hereinbefore-mentioned article by D. J. Goodman et al of choosing the code word or frequency associated with the row of the Decoded Matrix containing the greatest number of entries or corresponding magnitude. Typical circuits for performing such decision rule are disclosed, for example, in FIGS. 6-9 of U.S. Pat. No. 4,271,524 issued to D. J. Goodman et al on June 2, 1981 for the arrangement where no prior accumulation is performed and in FIGS. 7-9 thereof where no prior accumulation over the L-length sequence is performed. Under both conditions, the input to the Majority Logic Decision Circuit of FIGS. 6-9 which were used of Goodman et al will be from Spectrum Analyzer 46 of present FIG. 2. In the Goodman et al patent in one arrangement, a selector tree is used where each selector of the tree determines which of two separate inputs has the greater magnitude. The output from the selector tree is an indication of which level, or equivalent frequency, has the greatest magnitude over the L-length sequence. Once such determination is made, Majority Logic Decision circuit transmits an output signal indicating such determined level which a Level Decoder 52 uses to generate an equivalent K-bit word or analog signal sample for transmission to a particular user destination.

It is to be understood that the above-described embodiments are simply illustrative of the principles of the invention. Various other modifications and changes may be made by those skilled in the art which will embody the principles of the invention and fall within the spirit and scope thereof. For example, A/D converter 60 may be unnecessary where register 64 of FIG. 4 comprises, for example, a charge coupled device where it is desired to store accumulated analog signals rather than digital representations. When Decoder 32 includes a register 64 for storing accumulated analog signals, adder 62 can, for example, comprise the well-known analog signal adding circuit as shown, for example, in FIG. 9.4 of the book *Electronic Fundamentals and Applications, Integrated and Discrete Systems* by J. D. Ryder, 5th Edition, 1976, Prentice-Hall, which includes an Operational Amplifier that receives, for example, the present signals from Combiner 44 and the output signals from Register 64 over separate leads at the inverting input terminal thereof, has its non-inverting input terminal grounded and connects the output thereof to the input of Register 64. Similarly, filter 42 is unnecessary when mixer 38 of FIG. 2 comprises circuitry which only generates difference frequencies within the 0-15 frequency level range.

What is claimed is:

1. A decoding arrangement (32) for decoding one of one or more concurrent L-length frequency-hopped, Q-level frequency shift keyed input signals, each input signal being originally formed by modulating a particular user's L-length frequency-hopping address sequence with the particular user's message signal encoded as one of Q possible frequencies, where Q is a prime or an integer power of a prime; the decoding arrangement comprising:
   spectrum analyzing means (46) capable of generating an output signal indicative of the presence of each of the Q possible frequencies in the input signal thereto; and
   frequency-hopping address generating means (40) characterized in that
   the frequency-hopping address generating means (40) is capable of generating a first and a second L-length frequency-hopping address sequence associated with a particular user in the same and next lower band, respectively, of Q frequencies as the band of Q frequencies in the input signal to the decoding arrangement, the decoding arrangement further comprising:
   an image rejection mixer (36) capable of mixing frequencies of said first L-length address sequence and only the frequencies equal to or above said first address sequence in corresponding intervals in the input signal to the decoding arrangement for generating an output signal comprising difference frequencies within Q baseband frequency levels;
   a second mixer (38) capable of mixing frequencies of said second L-length address sequence and the frequencies in corresponding intervals in the input signal to the decoding arrangement for generating an output signal comprising difference frequencies within said Q baseband frequency levels;
   a combiner (44) capable of adding the output signals from said mixers and generating an output signal representative of such addition for subsequent spectral analysis by the spectrum analyzing means; and
   decision means (48) capable of determining which of the Q baseband frequency levels in the output signals of the spectrum analyzing means have a maximum value or length over said L-length sequence, and where more than one maximum value or length frequency level is found, choosing one of said maximum frequency levels.

2. A decoding arrangement in accordance with claim 1 characterized in that
   the decoding arrangement further comprises:
   accumulation means (50) coupled between said combiner and the spectrum analyzing means, said accumulation means being capable of accumulating the waveforms at the output of said combiner over each L-length sequence and generating an output signal to the spectrum analyzing means at the end of said L-length sequence representative of such accumulated waveforms.

3. A decoding arrangement in accordance with claim 2 characterized in that
   said accumulation means comprises:
   a register means (64) comprising an input and an output terminal, the output terminal forming the output of said accumulation means; and
   adding means (62) capable of adding the output signals from said combiner represented in either one of a digital and analog waveform and a present value stored in said register means and generating an output signal for storage in said register means representative of the value of such addition.

4. A method of decoding one of one or more concurrently received L-length frequency-hopped, Q-level frequency shift keyed input signals, each input signal being originally formed by modulating a particular user's L-length frequency-hopping address sequence with the particular user's message signal encoded as one of Q possible frequencies, where Q is an integer characterized in that the method comprises the steps of:
(a) mixing the frequencies of the particular user's frequency-hopping address sequence which are in the same band of Q frequencies as the input signal with the frequencies in the received input signal which are equal to or above the corresponding address sequence frequencies in each L-length sequence for generating a resultant signal comprising difference frequencies within Q baseband frequency levels;
(b) concurrent with step (a) mixing the frequencies of the particular user's frequency-hopping address sequence which are in the next lower band of Q frequencies than the input signal with the frequencies in the received input signal for generating difference frequencies within the Q baseband frequency levels of step (a); and
(c) combining the resultant signals generated in steps (a) and (b) for generating a demodulated and decoded output signal.

5. The method according to claim 4 characterized in that
the method comprises the further steps of:
(d) spectrum analyzing the output signal generated in step (c) once during each interval of each L-length sequence;
(e) storing the results of the spectrum analysis for each interval over each L-length sequence; and
(f) detecting which of the Q baseband frequency levels have a maximum number of frequency indications over an L-length sequence and choosing one of such levels if multiple equal maximum-numbered levels are found for determining the particular user's correct message signal.

6. The method according to claim 4 characterized in that
the method comprises the further steps of:
(d) accumulating the demodulated and decoded signals generated in step (c) over each L-length sequence;
(e) spectrum analyzing the overall accumulated signal at the end of each L-length sequence; and
(f) detecting which of the Q baseband frequencies have a maximum magnitude and choosing one of such frequencies when multiple frequencies are detected as having equal maximum magnitude for determining the particular user's correct message signal.

* * * * *